United States Patent [19]

Doi et al.

[11] Patent Number: 4,560,254
[45] Date of Patent: Dec. 24, 1985

[54] ZOOM LENS SYSTEM

[75] Inventors: Yoshikazu Doi; Kenzo Sado, both of Omiya, Japan

[73] Assignee: Fuji Photo Optical Co., Ltd., Saitama, Japan

[21] Appl. No.: 610,167

[22] Filed: May 14, 1984

[30] Foreign Application Priority Data

May 18, 1983 [JP] Japan ................................ 58-87142

[51] Int. Cl.$^4$ .......................... G02B 9/64; G02B 15/22
[52] U.S. Cl. ................................................... 350/427
[58] Field of Search .......................................... 350/427

[56] References Cited

U.S. PATENT DOCUMENTS 4,135,786  1/1979  Ikemori ................. 350/427

*Primary Examiner*—John K. Corbin
*Assistant Examiner*—Rebecca D. Gass
*Attorney, Agent, or Firm*—Sughrue, Mion, Zinn, Macpeak & Seas

[57] ABSTRACT

A mechanical compensation type zoom lens system capable of improving performances of large diameter lenses, wide angle lenses and highly variable magnification zoom lenses. This zoom lens system comprises a convergent lens group fixed during zooming, movable lens groups for zooming and an image-forming lens group. The movable lens groups comprise three groups including a first movable divergent lens group, a second movable convergent lens group and a third movable convergent lens group as arranged in the forward order. In the movable lens groups, an interval between the second movable convergent lens group and the third movable convergent lens group is increased on the wide angle side, whereby the movement value of the first movable divergent lens group is decreased. As the result, an entrance pupil position on the wide angle side is hardly changed, so that the distortional aberration can be corrected.

1 Claim, 7 Drawing Figures

ZOOM RATE

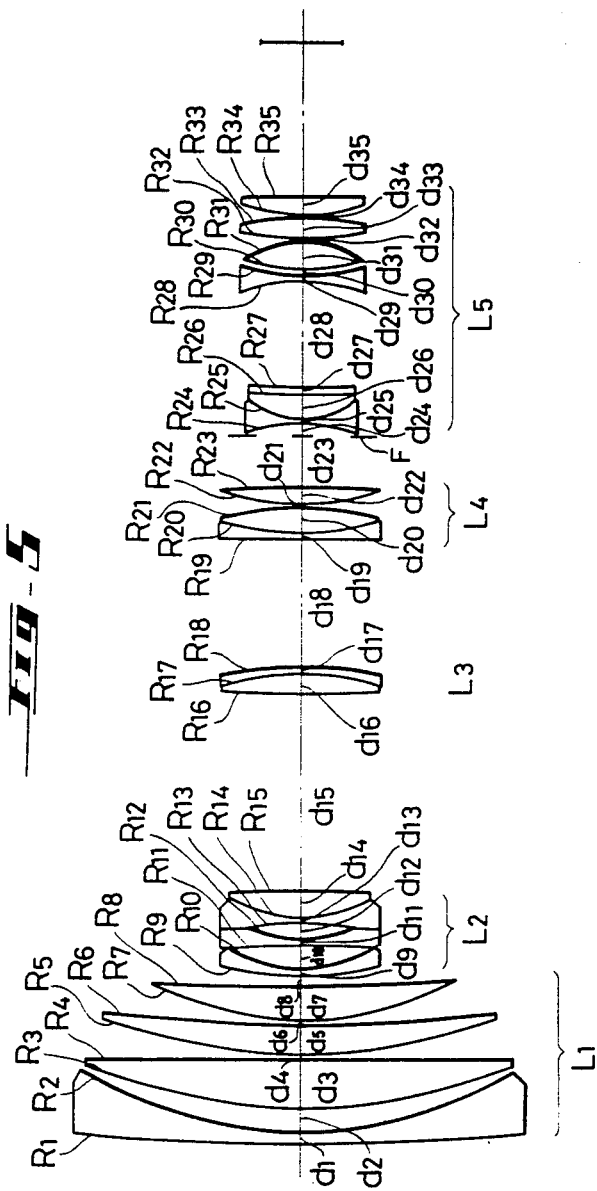

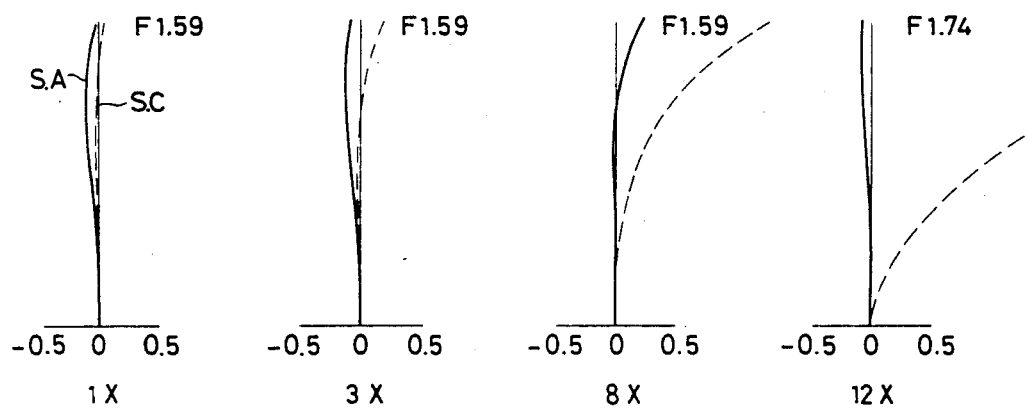
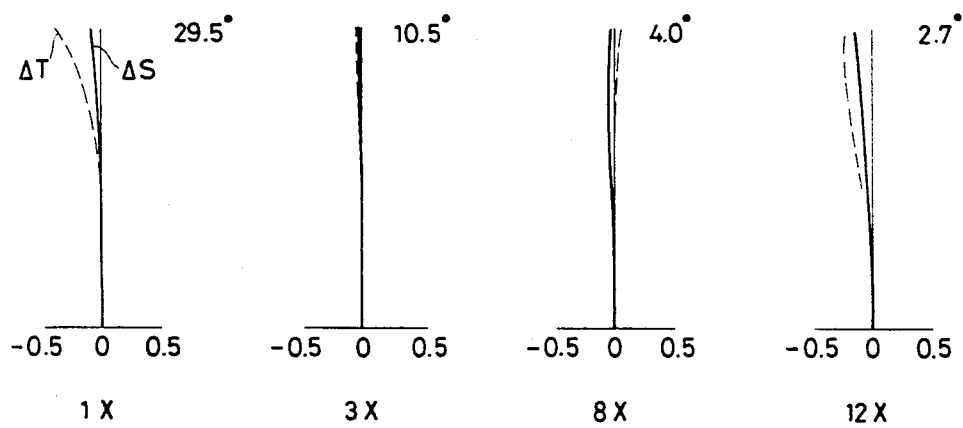

ZOOM LENS SYSTEM

BACKGROUND OF THE INVENTION

1. Field of the Invention

This invention relates to a mechanical compensation type zoom lens system capable of improving performances of large diameter lenses, wide angle lenses and highly variable magnification zoom lenses, and more particularly to a zoom lens system capable of effectively correcting distortional aberration greatly varying from minus to plus on the wide angle side.

2. Description of the Prior Art

As has been well known, a magnitude of a value of distortional aberration is determined mostly by an angle of incidence of light ω, focal lengths of groups of lenses apart from an aperture and shapes of the lenses.

In the case of the zoom lens system, as the zooming is effected from the wide angle side to the telephoto side, the angle of incidence of light ω is decreased, whereby the value of distortional aberration should necessarily be decreased as well.

However, in reality, the distortional aberration is greatly varied from minus to plus in the vicinity of the wide angle (Refer to FIG. 3). This positive distortional aberration is a so-called spool shaped and highly notable.

The inventor of the present invention proposes a zooming lens system according to the present invention on the basis of the recognition that the variation of distortional aberration in the vicinity of the wide angle is principally caused by a change of entrance pupil position due to zooming.

More specifically, there has heretofore been known that, in the case where the zooming is effected by two groups of lenses, the zooming contemplates to vary the magnification while the conjugate length of the two groups of lenses is held constant, so that relative positions (movement loci) of the two groups of lenses through the zooming may be given by a solution of a quadratic equation. Since the change of entrance pupil position is also determined by this solution, characteristic fluctuations of the distortional aberration cannot be corrected as it is.

There has been tried to correct this distortional aberration by shapes of lenses, which, however, necessitates other aberrations including spherical aberration, curvature of field and the like to be sacrificed to a considerable extent.

In general, during the zooming from the wide angle side W to the telephoto side T as shown in FIG. 1, a zoom lens system consisting of two movable lens groups including a first movable lens group of divergence and a second movable lens group of convergence draws loci indicated by solid lines in FIG. 1, with the first movable lens group $l_1$ moving rearwardly and the second movable lens group $l_2$ moving forwardly. In this case, the entrance pupil position P moves rearwardly, drawing a locus indicated by two-dot chain lines in FIG. 1.

Because of this, although an incident angle of view ω' is small in the vicinity of the wide angle (1.5× ~2.0× of zoom ratio) as shown in $W_1$ of FIG. 1, h' is large, thus largely contributing to the generation of positive distortional aberration.

To resolve this problem, it is necessary to find a zooming method in which the fluctuation value of entrance pupil position P on the wide angle side due to zooming is small.

SUMMARY OF THE INVENTION

The zoom lens system according to the present invention comprises a convergent lens group fixed during zooming, movable lens groups for zooming and image-forming lens group. The movable lens groups consist of three groups including a first movable divergent lens group, a second movable convergent lens group and a third movable convergent lens group as arranged in the forward order from an object.

The present invention contemplates to provide a zooming lens system in which, in consideration of that the largest factor in determining the entrance pupil position is the movement value of the first movable divergent lens group, the magnification is varied while the first movable lens group moves as little as possible on the wide angle side, i.e. a zooming lens system in which both the second and the third movable lens groups are made to be convergent lens groups, and an interval between the second and the third movable lens groups is widened on the wide angle side to vary the magnification, whereby the movement of the first movable lens group in the vicinity of the wide angle is suppressed.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 5 is a sectional view showing an embodiment of the zoom lens system according to the present invention;

FIG. 6 shows the spherical aberrations and the sine conditions in the embodiment shown in FIG. 5; and FIG. 7 shows astigmatisms in the embodiment shown in FIG. 5.

DETAILED DESCRIPTION OF THE INVENTION

Description will hereunder be given of the preferred embodiments of a zoom lens system according to the present invention with reference to the accompanying drawings.

Figure 2:
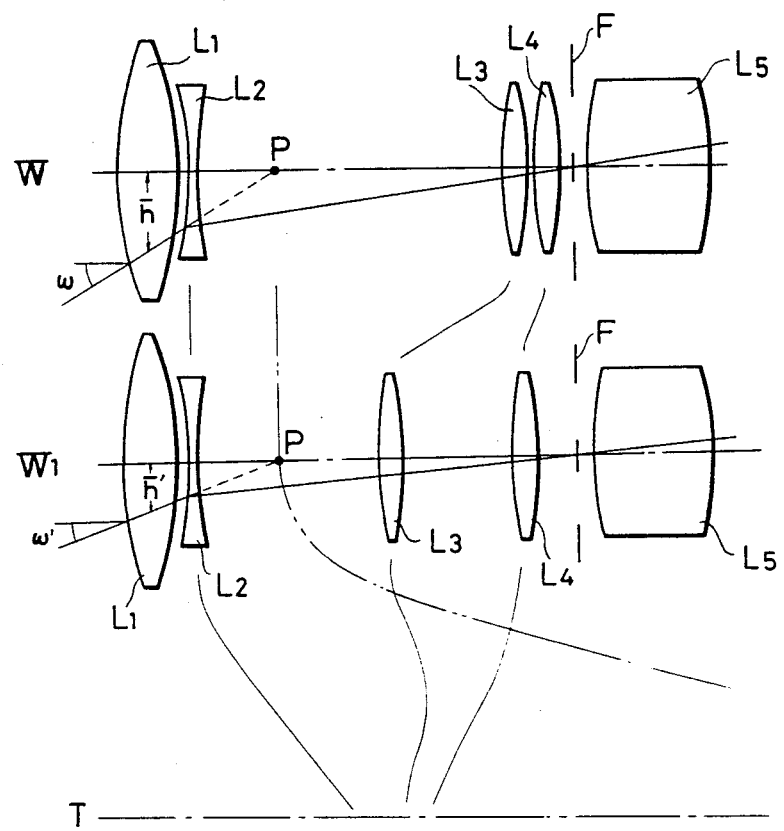
FIG. 2 is a sectional view showing zooming movement loci of the zoom lens system according to the present invention.

FIG. 2 is a sectional view of the zoom lens system showing the principle of the present invention, which comprises a lens group $L_1$ fixed during zooming, a first movable divergent lens group $L_2$, a second movable convergent lens group $L_3$, a third movable convergent lens group $L_4$, an aperture F and image-forming lens group $L_5$ as arranged in the forward order from an object.

For the zooming on the wide angle side, an interval between the second movable convergent lens group $L_3$ and the third movable convergent lens group $L_4$ is widened to vary the magnification, whereby the movement of the first movable lens group $L_2$ is suppressed. In consequence, an entrance pupil position P on the wide angle side ranging from W to $W_1$ in FIG. 2 hardly moves, whereby a height of incidence $\bar{h}'$ is decreased with the decrease of an angle of incidence $\omega'$, so that a distortional aberration can be corrected.

Figure 1:
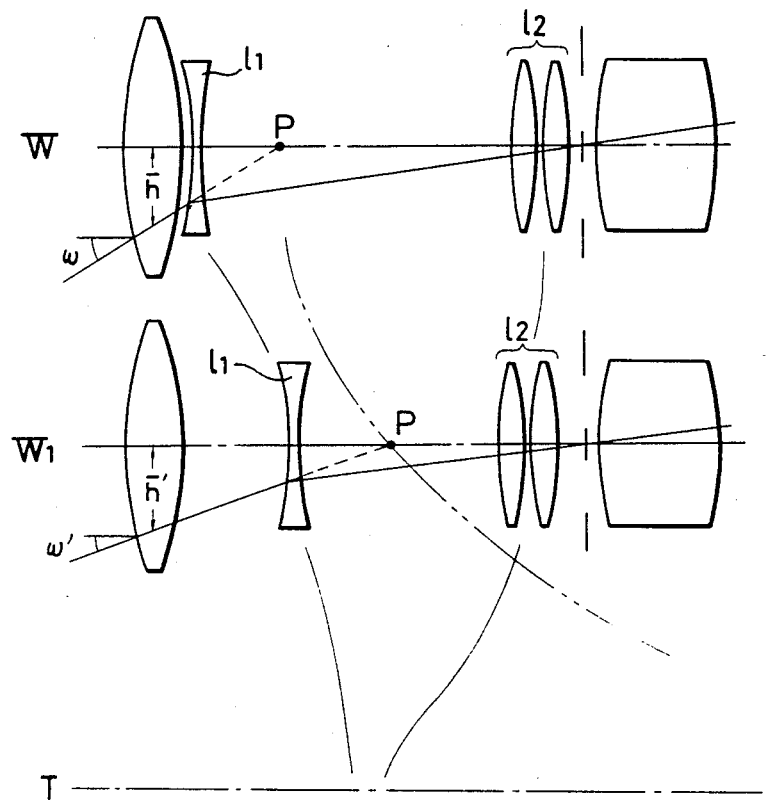
FIG. 1 is a sectional view showing zooming movement loci of the conventional zoom lens system.
Figure 3:
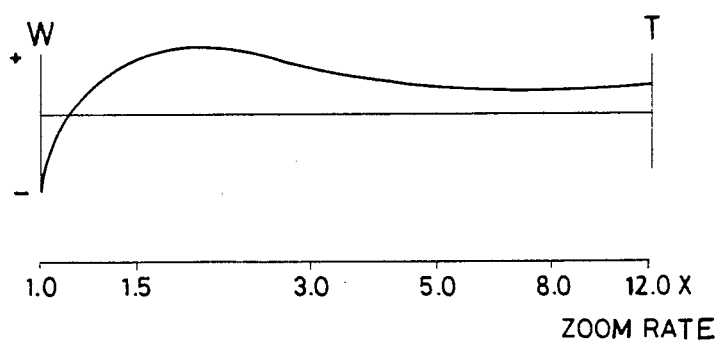
FIG. 3 is a general view of the distortional aberration of the conventional zoom lens system.
Figure 4:
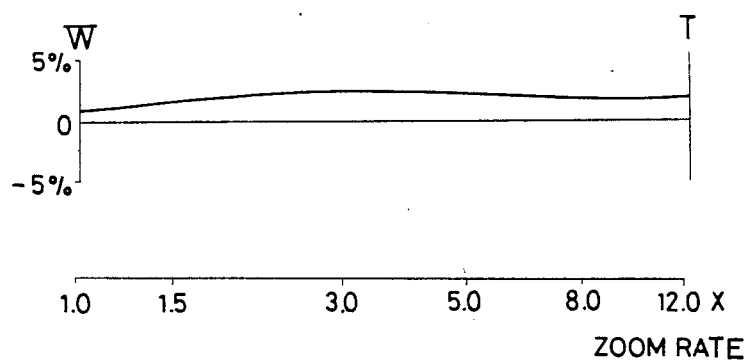
FIG. 4 is a view of the distortional aberration of the zoom lens system according to the present invention.

FIG. 3 shows the characteristics of fluctuations of distortional aberration to the zoom ratio of the conventional two group movable zoom lenses, which greatly fluctuates from minus to plus in the vicinity of the wide angle. FIG. 4 shows the fluctuations of distortional aberration in an embodiment of the present invention, and it is understood that the fluctuations of distortional aberration on the wide angle side are corrected as compared with the example of the prior art shown in FIG. 3.

FIG. 5 is a sectional view of the zoom lens system embodying the present invention, which comprises the zooming lens groups including the lens group $L_1$ fixed during zooming, the first movable divergent lens group $L_2$, the second movable convergent lens group $L_3$ and the third movable convergent lens group $L_4$, the aperture F and the image-forming lens group $L_5$, as arranged in the forward order from the object. In the zoom lens system shown in FIG. 5, the following working data are formed, where R are radii of curvature of respective lenses, d intervals between the respective lenses, n a refractive index and $\nu$ a dispersion of an optical material used in the respective lenses.

TABLE 1

|    | R       | d     | n       | ν    |
|----|---------|-------|---------|------|
| 1  | 941.61  | 4.0   |         | 25.5 |
| 2  | 132.80  | 7.09  | 1.80518 | 25.5 |
| 3  | 183.71  | 17.75 |         |      |
| 4  | −5305.7 | 0.2   | 1.62041 | 60.3 |
| 5  | 177.46  | 11.53 |         |      |
| 6  | 557.19  | 0.2   | 1.69680 | 55.6 |
| 7  | 109.91  | 11.5  |         |      |
| 8  | 816.32  | d8    | 1.713   | 53.9 |
| 9  | 96.32   | 1.5   |         |      |
| 10 | 40.104  | 8.5   | 1.713   | 53.9 |
| 11 | −274.42 | 1.5   |         |      |
| 12 | 54.927  | 6.0   | 1.713   | 53.9 |
| 13 | −92.479 | 1.5   |         |      |
| 14 | 46.158  | 8.3   | 1.69680 | 55.6 |
| 15 | −602.01 | d15   | 1.80518 | 25.5 |
| 16 | 418.75  | 6.52  |         |      |
| 17 | −83.913 | 2.0   | 1.62299 | 58.1 |
| 18 | −138.18 | d18   | 1.80518 | 25.5 |

TABLE 1-continued

|    | R         | d     | n       | ν    |
|----|-----------|-------|---------|------|
| 19 | 39263.0   | 2.0   |         |      |
| 20 | 82.132    | 9.0   | 1.80518 | 25.5 |
| 21 | −94.806   | 0.2   | 1.62299 | 58.1 |
| 22 | 79.44     | 5.75  |         |      |
| 23 | −592.65   | d23   | 1.62299 | 58.1 |
| F  | APERTURE  |       |         |      |
| 24 | −62.079   | 3.0   | 1.734   | 51.3 |
| 25 | 26.597    | 2.0   | 1.80518 | 25.5 |
| 26 | 229.84    | 8.0   | 1.734   | 51.3 |
| 27 | 151.46    | 2.0   |         |      |
| 28 | −58.175   | 35.0  |         |      |
| 29 | 60.126    | 2.0   | 1.80518 | 25.5 |
| 30 | 64.632    | 1.0   |         |      |
| 31 | −36.098   | 10.0  | 1.51633 | 64.0 |
| 32 | 144.92    | 0.2   |         |      |
| 33 | −85.911   | 7.5   | 1.51633 | 64.0 |
| 34 | 51.300    | 0.2   |         |      |
| 35 | −855.94   | 6.5   | 1.51633 | 64.0 |

|     | 1×     | 1.5×  | 3×    | 8×    | 12×   |
|-----|--------|-------|-------|-------|-------|
| d8  | 3.052  | 3.16  | 47.36 | 69.52 | 75.63 |
| d15 | 119.77 | 65.02 | 60.68 | 18.22 | 0.9   |
| d18 | 2.5    | 42.5  | 2.5   | 2.5   | 2.5   |
| d23 | 2.72   | 17.36 | 17.5  | 37.80 | 49.01 |

FIG. 6 shows the spherical aberrations and the sine conditions in the data of the embodiment shown in FIG. 5, and FIG. 7 shows the astigmatisms of the embodiment shown in FIG. 5. In FIG. 6, solid lines (S.A) indicate the spherical aberrations and broken lines (S.C) indicate the sine conditions. In FIG. 7, solid lines ($\Delta$S) indicate the sagittal image curvatures and broken line ($\Delta$T) indicate the tangential (meridional) image curvatures. As apparent from FIGS. 6 and 7, in the zoom lens system according to the present invention, when the distortional aberration is corrected, the spherical aberration and the astigmatism are not adversely affected.

What is claimed is:

1. A zoom lens system comprising: a convergent lens group fixed during zooming; movable lens groups for zooming; and an image-forming lens group, wherein
    said movable lens groups comprise three groups including: a first movable divergent lens group; a second movable convergent lens group; and a third movable convergent lens group, as arranged in the forward order, and
    an interval between said second movable convergent lens group and said third movable convergent lens group is varied to be widened on the wide angle side, whereby the movement value of said first movable divergent lens group is decreased.

* * * * *